Figure 1:
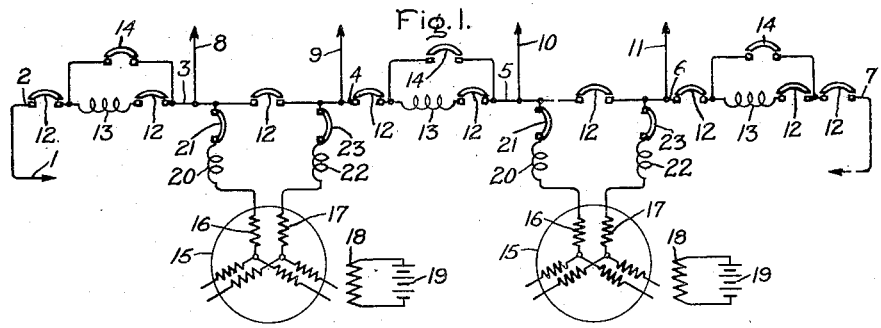

July 21, 1931.   T. F. BARTON   1,815,823

SYSTEM OF ELECTRICAL DISTRIBUTION

Filed May 9, 1928

Inventor:
Theophilus. F. Barton,
by Charles E. Tullar
His Attorney.

Patented July 21, 1931

1,815,823

UNITED STATES PATENT OFFICE

THEOPHILUS F. BARTON, OF UPPER MONTCLAIR, NEW JERSEY, ASSIGNOR TO GENERAL ELECTRIC COMPANY, A CORPORATION OF NEW YORK

SYSTEM OF ELECTRICAL DISTRIBUTION

Application filed May 9, 1928. Serial No. 276,469.

My invention relates to systems of electrical distribution and more particularly to busbar systems and systems of connection for central generating stations and sub-stations of distribution systems.

For purposes of increased economy the present tendency in power generation is toward larger central stations with larger generating units. As a consequence, large amounts of power are concentrated on a single bus or bus section making the system susceptible to highly destructive phenomena due to electrical, thermal and magnetic effects which occur upon the occasion of faults on the busbars or feeders unless suitable power limiting means are employed.

The usual practice in the past has been to employ various arrangements of external reactances such for example as reactors in the generator leads, in tie lines between different stations, between different sections of the station busbars, in the feeder circuits, and various combinations of the above. The principal purpose of reactance coils in the generator leads is to afford protection to the armature windings in addition to the generator self inductive reactance by limiting the amount of current which may flow therefrom upon the occasion of a fault on the busbar or feeder circuits closely associated therewith, and to limit the power which the bus can feed back into the generator in case of a fault in the generator. Reactance coils or power limiting reactors are inserted in the busbars to sectionalize the bus so as to limit the power which can flow along the busbars from one side of the reactor to the other, and thereby limit the amount of current which would otherwise flow from all units connected to the bus into a fault on a given section. The reactors at the same time permit the desirable and practically necessary parallel operation of different generating units in the same station or in different parts of the system and also permit an exchange of current or a shifting of load between different parts of the system. However, a reactance above a critical value between synchronous machines reduces the synchronizing power and may cause continued hunting between machines or complete loss of synchronism or instability during faults or system disturbances. With large amounts of power concentrated on a bus or bus section, bulky and expensive reactors are required in order to limit the amount of power which can flow from all bus sections into a short circuit on any one bus section and thereby confine a fault to the section in which it originates. In addition to the cost of the reactors and necessary switching equipment considerable expense is entailed in providing sufficient and adequate space to house the reactors and switches which in metropolitan areas may amount to more than twice as much as the cost of the equipment occupying the space. It is, therefore, evident that from the point of view of economy and reliability of operation it is desirable to reduce the number, or eliminate, bus sectionalizing reactors in large central stations or substations and provide other means to permit parallel operation and interchange of power between different parts of the system as well as to limit the power concentration at any point in the system.

It is an object of my invention to provide a new and improved arrangement in interconnected systems of electrical distribution and busbar systems of central generating stations and substations for improving the power control and stability of systems of distribution.

Another object of my invention is to provide an improved system of connections for a plurality of dynamo-electric machines whereby the usual current-limiting bus sectionalizing reactors, or reactors in tie lines between stations, or between different sections of the same stations may be reduced in number or eliminated while providing equivalent or better protection against short circuits, faults or other disturbances in the system.

Figure 2:
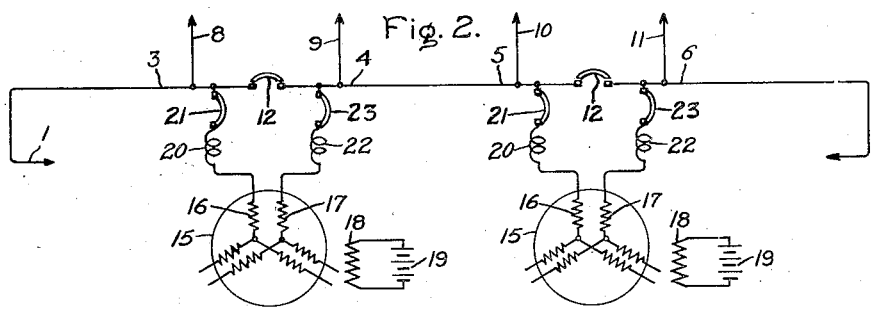
Figure 3:
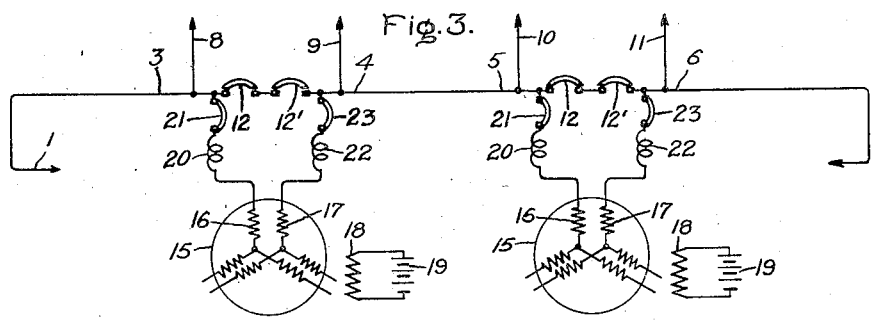
Figure 4:
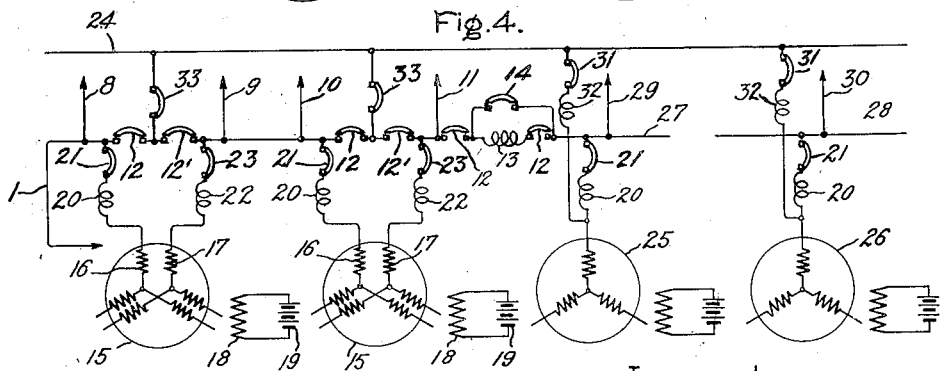

The novel features which I believe to be characteristic of my invention are set forth with particularity in the appended claims, the invention itself, however, both as to organization and method of operation together with further objects and advantages thereof will be better understood by reference to the following description taken in connection with the accompanying drawings in which Fig. 1 is a diagrammatic illustration of a busbar arrangement embodying my invention, Figs. 2 and 3 are modifications of the arrangement shown in Fig. 1, and Fig. 4 shows an embodiment of my invention in a busbar system employing an auxiliary or synchronizing bus.

In accordance with the embodiment of my invention illustrated diagrammatically in the drawings the generators themselves act to provide reactance which is ordinarily provided by bus sectionalizing reactors. The usual bus sectionalizing reactor with an oil switch on each side of it, an oil switch for by-passing the reactor, and disconnecting switches on each side of these oil switches are replaced in a simple embodiment of my invention merely by a single oil switch with its disconnecting switches, which when closed, directly connects the bus sections together. When this oil switch is open the bus sections are connected together through separately insulated generator windings which are connected respectively to different bus sections and interconnect the bus sections through the coupling effect of the two windings.

Referring to Fig. 1 of the drawings, 1 indicates a portion of a station bus which may be of the ring or chain type in a single or duplicate busbar system. For purposes of simplicity a one line diagrammatic representation has been used in this figure as well as in the remaining figures to illustrate all of the circuits except the armature and field windings of the generators. The bus 1 may comprise any number of sections but for purposes of illustration I have shown only six sections designated as 2, 3, 4, 5, 6 and 7. A large number of feeder circuits may be arranged to be supplied from each bus section and by way of example single feeder circuits, 8, 9, 10 and 11 are shown connected, respectively, to bus sections, 3, 4, 5 and 6. The bus sections have interposed therebetween suitable bus sectionalizing switches 12 which under the usual conditions of operation are maintained in a circuit interrupting position and are moved to a circuit closing position only when it is desirable to connect adjacent bus sections directly together. These switches as well as the other switches in the diagram of connections are shown very diagrammatically and may be of any suitable type, such for example, as various types of oil switches well known in the art. Between every other section, namely, sections 2 and 3, 4 and 5, and 6 and 7, I have shown an interconnection which is in accordance with the known practice and comprises a bus reactor 13 with a switch 12 on each side thereof and interposed in series therewith between bus sections, and by-pass switches 14 which control a circuit in shunt to each reactor 13 and a switch 12, to permit direct interconnection of adjacent sections.

In accordance with my invention the remaining sections, namely, 3 and 4, and 5 and 6 have interposed therebetween a single switch 12 and are interconnected by two separately insulated windings of the source of supply for the bus, diagrammatically illustrated as double winding alternating current generators 15. Each generator comprises two separately insulated stator windings 16 and 17 and a field winding 18 which is energized by a suitable source of excitation diagrammatically illustrated as a battery 19. The winding 16 is connected through an inductive device 20 which may take the form of the usual generator reactor as shown, or it may be a transformer if it is found desirable to energize the feeder circuits at a higher voltage than it is practicable to generate in the armature winding of the dynamo-electric machines. In the latter case the self inductive reactance of the transformer windings may perform the function of the single coil reactor. A suitable switch 21 such as the usual type of oil switch is interposed between the inductive device 20 and the bus section to interrupt the circuit through the inductive device and the generator winding 16 upon the occasion of a fault or short circuit, or to isolate the inductive device 20 and the generator winding 16 from the system whenever it is found desirable or necessary. The winding 17 is connected through a similar inductive device 22 and switch 23 to the adjacent bus section.

There are several known types of double windings for alternating current machines which may be utilized in carrying out my invention. One type consists of two complete and independent windings in the same stator slots with each winding having two coil sides in every slot. This is the type of winding generally used for multi-speed induction motors and is well known in the art. However, it is the most expensive type, because it has the greatest amount of insulation per slot and hence the least copper space. Furthermore, it is not the most suitable type of winding for two equally loaded circuits with symmetrical load characteristics on account of the slight difference in reactance between the two windings.

Another type of winding which may be used is the standard two-circuit winding which is well known in the art and comprises two distinct circuits with alternate poles in series in each circuit. With a two pole machine, for example, instead of connecting the windings for each pole in parallel inside the machine, the terminals from each winding may be brought outside and connected to separate loads. This winding is cheaper than the first type mentioned because it requires only standard insulation, coils and connections. For two pole machines any inequality in loads fed from the two circuits will cause magnetic unbalance and this winding would not be commercially practicable in this instance. However, for any number of poles greater than two the alternate connection of poles affords magnetic symmetry and permits the machine to operate satisfactorily when the windings are connected to adjacent bus sections whether equally or unequally loaded. The reactance between windings is obviously very high on account of the great separation between corresponding phases of different circuits and where it is desirable and necessary to provide for exchanging current or shifting load from different bus sections or different parts of the system it is necessary to use a type of winding which has a reasonably low reactance between the separate windings such as the type of winding previously described.

A third type of winding which is particularly suitable for large generators and which has the best characteristics for providing the combined requirements of protection against faults and interchange of power between bus sections or different parts of the systems is one in which two complete windings are arranged in alternate slots in the stator core as described and claimed in a copending application of Delmar D. Chase, Serial No. 276,467 filed May 9, 1928, and assigned to the assignee of the present application. This winding consists of two separate circuits with the conductors of corresponding phase belts of different circuits distributed in alternate slots around the complete periphery of the stator core. Since the voltages in the two circuits under one pole are out of phase by an angle corresponding to the slot pitch it is necessary to alternate the circuits which are leading under adjacent poles. This winding requires no additional insulation or space over the well known standard two circuit type of winding discussed just previously.

The arrangement shown in Fig. 1 permits increased sub-division of a bus when a single bus system is used without increasing the number of reactors, switches, and other equipment, otherwise necessary if the usual method of sectionalization is employed. This increased sub-division is particularly important because provision must be made in any switching center to isolate completely any section that develops a fault due either to a fault at the bus section or in the apparatus directly connected to the bus section. It is evident, therefore, that the amount of generator capacity connected to a single bus section and the amount of load taken from a single bus section should not exceed a certain percentage of the total capacity of the system. Or looking at it another way, the capacity of any section to be removed should not be greater than an amount which can be removed from the system without seriously interfering with system operation. Hence, as generating units are increased in output, the desirability of increasing the sub-division of the bus will be readily appreciated. With the arrangement shown in Fig. 1 it is entirely possible and commercially practicable to build a generator, for example, of 160,000 kilowatts capacity having all the advantages of a large capacity generating unit and still have only half the total output of such a machine connected directly to a single bus section.

In Fig. 2 I have shown a modification of the arrangement shown in Fig. 1 wherein the usual bus sectionalizing reactors and switches have been replaced by a single switch 12 and wherein the several bus sections are interconnected by the two individual circuits 16 and 17 of generators 15. The inductive devices 20 and 22 shown as reactors and the switches 21 and 23 are arranged similarly to the corresponding inductive devices and switches in Fig. 1. In normal operation the bus tie switch 12 is open and is only closed in case the generator feeding the two adjacent sections is out of service.

It is to be noted in this arrangement that the several bus sections are synchronized and tied together through the two windings of the individual generators. The reactance introduced between sections is the reactance of the two inductive devices 20 and 22, and the self-inductive reactance of the generator windings. In this way the series reactance of the two generator circuits is interposed between bus sections so that the amount of power flowing from one bus section to the other is more limited than when using a permissible size of bus sectionalizing reactor in accordance with the practice in the prior art. This results in lower short circuit kilovolt amperes obtained at any bus section fault for a given aggregate generator capacity connected to the system. Furthermore, it will be noted that different adjacent generators are tied together by the same bus section and the two generator inductive devices so that the generators are synchronized through a lower included reactance than is possible with the usual sectionalizing arrangement using reactors between individual machines, thereby improving parallel operation and increasing the system stability. On the other hand, since the two generator windings of a single unit are on the same stator core structure and have a common field excitation they cannot fall out of synchronism.

In Fig. 3 I have shown a modification of the arrangement shown in Fig. 2 to obtain increased reliability of service. It may not be desirable to use only one bus section switch per section since a fault on a single switch would involve the two adjacent sections interconnected thereby. Such a condition is avoided by using two bus tie switches 12 and 12' in series. In this case there is a saving of one switch and one reactor per section over the usual practice of sectionalization by reactors, in addition to the improved parallel operation and increased stability of operation due to the nature of the tie between the synchronous machines of the system.

The interconnection of bus sections by means of double winding sources of electrical energy in accordance with my invention as illustrated in Figs. 2 and 3 not only permits the elimination of bus reactors and reduces the number of switches required but in general allows reducing the ampere rating of the generator oil switches to one-half of the rating that would be required with a single winding source of electrical energy, and, in addition reduces greatly the interrupting capacity required, since greater reactance can be provided in the system with the double winding machines than when bus reactors are used, without the disadvantage of the high reactance affecting parallel operation and system stability. In order to appreciate the significance of the foregoing advantages it is important to distinguish between ampere carrying capacity of a switch, that is, the number of amperes that can be safely carried continuously, and the kilovolt-ampere interrupting capacity of a switch. For example, a 160,000 KW machine utilized in a bus system in accordance with the prior art practice with a machine voltage of 11,000 volts requires a switch capable of carrying about 8400 amperes and if the usual safety factor is employed, a switch of 10,000 ampere capacity would be required. With the bus bar system of connections in accordance with my invention it is possible to use 5000 ampere units for each circuit when the aggregate generating capacity connected to a bus is 160,000 kilowatts. With the present tendency of larger generating units the importance of means permitting the use of switches having a smaller ampere rating will be appreciated when it is realized that the type of oil switch commonly used cannot be obtained with an ampere rating much above 6000 amperes.

In Fig. 4 I have shown an embodiment of my invention which is adapted for use in connection with existing systems utilizing an auxiliary bus for synchronizing purposes. In this arrangement the auxiliary or synchronizing bus is designated by 24 and is used to act as a transfer bus for the double winding machines 15, and a synchronizing bus for the existing machines of the system designated by 25 and 26. The machines 25 and 26 are diagrammatically illustrated as three-phase single-winding alternating current generators connected to bus sections 27 and 28, respectively, through a suitable inductive device or reactor and switch which are designated respectively by the numerals 20 and 21 for ease of identification with corresponding and similar elements illustrated in Figs. 1, 2 and 3. The bus sections 27 and 28 are connected to feeders 29 and 30, respectively. Generators 25 and 26 are connected to the auxiliary or synchronizing bus 24 through a suitable switch 31 and a reactance 32. Two switches 12 and 12' are interposed between the adjacent sections interconnected by the double winding generators 15 as shown in Fig. 3 and a bus reactor 13, and switches 12 and 14, as shown in Fig. 1, are utilized to interconnect bus 27 of the existing system or portion of the main bus of the single-winding generators and the adjacent bus section energized by the double winding generators 15, in order to insure a synchronizing tie between the double-winding generator sections and the single-winding generator sections.

The arrangement just described provides a bus-bar system utilizing double-winding generators with a transfer bus so that the capacity available at any section of the bus system may be transferred to any other section. Normally, when no transfer of power is required switches 12 and 12', interposed between the adjacent bus sections interconnected by double winding generator 15, are maintained open. Any bus section on this system can obtain power from three sources; that is, from either winding of a double-winding generator 15 or from generators 25 and 26 through the auxiliary bus 24. A connection is made between switches 12 and 12' of each double-winding generator to bus 24 through switches 33. Thus, if it is desirable to have generator 25 feed power into the bus section supplying feeder 11, switches 33 and 12' will be closed and a direct connection is obtained between generator 25 through its synchronizing reactor 32 and switch 31, auxiliary bus 24, switch 33 and switch 12' to feeder 11. Various other connections for effecting transfer of power from the other machines or windings will be obvious to those skilled in the art and it is believed unnecessary for an understanding of this embodiment of my invention to elaborate in any more detail.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:—

1. In combination, a plurality of distribution circuits, and a dynamo-electric machine having a plurality of separately insulated windings connected to different distribution circuits and arranged normally to supply electrical energy to the distribution circuit connected thereto, said separately insulated windings being so arranged as to permit an interchange of power between said distribution circuits.

2. In combination, a main bus comprising a plurality of separate bus sections, and inductive means including a dynamo-electric machine having two separately insulated circuits of substantially in phase voltages connected respectively to different bus sections for interconnecting a plurality of said bus sections.

3. In a system of distribution, a plurality of busbars for energizing different distribution circuits, and synchronous dynamo-electric machines each having a plurality of separately insulated windings constructed and arranged to permit a transfer of power therebetween and connected respectively to different busbars.

4. In combination, two busbars for supplying different distribution circuits, and means comprising a dynamo-electric machine having separately insulated windings in close inductive relation for interconnecting said busbars.

5. In a system of distribution, a plurality of busbar sections, distribution circuits connected to each section, a normally open switch interposed between said sections, and synchronous dynamo-electric machines having separately insulated windings in close inductive relation for interconnecting different bus sections through the inductive coupling between said windings.

6. In a system of distribution, a plurality of busbar sections, distribution circuits connected to each section, a normally open switch interposed between said sections, and synchronous dynamo-electric machines having separately insulated windings in close inductive relation for interconnecting adjacent bus sections through the inductive coupling between said windings.

7. In a system of distribution, a plurality of busbar sections, feeder circuits connected to each section, a plurality of normally open switches connected in series relation between said sections, and synchronous dynamo-electric machines having separately insulated windings in close inductive relation for interconnecting adjacent bus sections through the inductive coupling between said windings.

8. In a system of distribution, a main bus comprising a plurality of sections, and a plurality of synchronous dynamo-electric machines each comprising a plurality of separately insulated windings connected to said bus sections so that the windings of the same machine are connected to different bus sections and some of the windings of different machines are connected to the same bus section.

9. In a system of distribution, a main bus comprising a plurality of sections, and a plurality of synchronous dynamo-electric machines each comprising two separately insulated windings connected to said bus sections so that one winding of a given machine is connected to a given bus section while the other winding thereof is connected to an adjacent bus section which section in turn is connected to the winding of another one of said dynamo-electric machines whose other winding is connected to the next adjacent section.

10. In a system of distribution, a plurality of busbar sections, distribution circuits connected to said sections, a normally open switch interposed between said sections, synchronous dynamo-electric machines having separately insulated windings in close inductive relation for interconnecting different bus sections through the inductive coupling between said windings, and an inductive device interposed between each of said windings and the bus section to which it is connected.

11. In a system of distribution, a main bus comprising a plurality of sections, a plurality of synchronous dynamo-electric machines each comprising two separately insulated windings connected to said bus sections so that one winding of a given machine is connected to a given bus section while the other winding thereof is connected to an adjacent bus section which section in turn is connected to the winding of another one of said dynamo-electric machines whose other winding is connected to the next adjacent section, a normally open switch interposed between adjacent sections and a switch interposed between each machine winding and the bus section to be connected thereto.

12. In a system of distribution, a main distribution bus comprising a plurality of sections, a group of double-winding dynamo-electric machines each comprising two separately insulated windings in close inductive relation for interconnecting predetermined adjacent sections of said main bus, two normally open switches interposed between each of said adjacent sections, another group of single-winding dynamo-electric machines connected to other and independent bus sections, an auxiliary bus, means for connecting each of said single-winding dynamo-electric machines to said auxiliary bus for providing a synchronizing tie therebetween, means for providing a synchronizing tie between the portion of the bus interconnected by said double-winding machines and the portion of the bus to which said single-winding machines are connected, and means each comprising a normally open switch for providing an interconnecting means between said auxiliary bus and a point between said plurality of normally open switches interposed between said adjacent sections whereby said auxiliary bus may be utilized as a synchronizing bus for said single-winding machines and a bus for permitting interchange of power between the bus sections to which said double-winding machines are connected and the bus sections to which said single-winding machines are connected.

13. In a system of distribution, a main distribution bus comprising a plurality of sections, a group of double-winding dynamo-electric machines each comprising two separately insulated windings in close inductive relation for interconnecting predetermined adjacent sections of said main bus, two normally open switches interposed between each of said adjacent sections, another group of single-winding dynamo-electric machines connected to other and independent sections, an auxiliary bus, means comprising a reactance and a switch for connecting each of said single-winding dynamo-electric machines to said auxiliary bus, means comprising a reactance interposed between two normally closed switches for interconnecting the portion of the main bus interconnected by said double-winding machines and the portion of the main bus to which said single-winding machines are connected for providing a synchronizing tie therebetween, and a circuit including a normally open switch between said auxiliary bus and a point between each group of said normally open switches interposed between said adjacent sections whereby said auxiliary bus may be utilized as a synchronizing bus for said single-winding machines and a bus for permitting interchange of power between said bus sections to which said double-winding machines are connected and the bus sections to which said single-winding machines are connected.

In witness whereof, I have hereunto set my hand this 7 day of May, 1928.

THEOPHILUS F. BARTON.